(12) United States Patent
Tiwari

(10) Patent No.: US 10,158,419 B2
(45) Date of Patent: Dec. 18, 2018

(54) WIRELESS COMMUNICATION UTILIZING POST-AMPLIFICATION CARRIER AGGREGATION

(71) Applicant: Facebook, Inc., Menlo Park, CA (US)

(72) Inventor: Abhishek Tiwari, Cypress, CA (US)

(73) Assignee: Facebook, Inc., Menlo Park, CA (US)

(*) Notice: Subject to any disclaimer, the term of this patent is extended or adjusted under 35 U.S.C. 154(b) by 217 days.

(21) Appl. No.: 15/140,285

(22) Filed: Apr. 27, 2016

(65) Prior Publication Data
US 2017/0317741 A1  Nov. 2, 2017

(51) Int. Cl.
*H04B 7/185* (2006.01)
*H04B 1/04* (2006.01)
*H04B 1/16* (2006.01)

(52) U.S. Cl.
CPC ....... *H04B 7/18504* (2013.01); *H04B 1/0483* (2013.01); *H04B 1/1607* (2013.01)

(58) Field of Classification Search
CPC .. H01Q 13/0208; H01Q 1/28; H04B 7/18504; H04B 1/0483; H04B 1/1607
See application file for complete search history.

(56) References Cited

U.S. PATENT DOCUMENTS

| | | | | |
|---|---|---|---|---|
| 4,602,218 A * | 7/1986 | Vilmur | ............... | H03G 3/3042 330/129 |
| 6,128,478 A * | 10/2000 | Kim | ............... | H03F 1/0288 330/124 R |
| 9,316,733 B2 * | 4/2016 | Mohamadi | ............... | G01S 13/89 |
| 2003/0118306 A1 * | 6/2003 | Deliwala | ............... | B82Y 20/00 385/125 |
| 2004/0208562 A1 * | 10/2004 | Ufongene | ............... | H04J 14/0227 398/59 |
| 2007/0166040 A1 * | 7/2007 | Jang | ............... | H04J 14/02 398/85 |
| 2010/0093299 A1 * | 4/2010 | Pinel | ............... | G06G 7/12 455/226.1 |
| 2012/0315044 A1 * | 12/2012 | McGreer | ............... | H04J 14/02 398/66 |

(Continued)

OTHER PUBLICATIONS

Bassam, S., et al., "Transmitter Architecture for CA", *IEEE Microwave Magazine*, vol. 14, Issue 5, (Jul./Aug. 2013).

(Continued)

*Primary Examiner* — Omer S Mian
(74) *Attorney, Agent, or Firm* — Baker Botts L.L.P.

(57) ABSTRACT

In one embodiment, a method includes receiving two or more input radio-frequency (RF) signals, each input RF signal being received on a separate input channel and having a different frequency range. The method also includes amplifying each input RF signal of the two or more input RF signals separately to produce two or more respective amplified RF signals. The method further includes aggregating the two or more amplified RF signals into one aggregated communication signal using a passive waveguide multiplexer, where the aggregated communication signal is an E-band communication signal having a frequency range within approximately 71-76 GHz or approximately 81-86 GHz. The method also includes transmitting the aggregated communication signal.

19 Claims, 6 Drawing Sheets

(56) References Cited

U.S. PATENT DOCUMENTS

| | | | | |
|---|---|---|---|---|
| 2013/0279910 A1* | 10/2013 | Ziari | ............... | H04J 14/06 |
| | | | | 398/65 |
| 2014/0036744 A1* | 2/2014 | Zeng | ............... | H04L 5/00 |
| | | | | 370/297 |
| 2014/0168010 A1* | 6/2014 | Mohamadi | ......... | H04B 7/18506 |
| | | | | 342/357.39 |
| 2015/0303952 A1* | 10/2015 | Zeng | ............... | H04L 5/00 |
| | | | | 370/297 |
| 2016/0099127 A1* | 4/2016 | Aditya | ............ | H01J 23/26 |
| | | | | 315/39 |
| 2016/0134006 A1* | 5/2016 | Ness | ............. | H01Q 1/1257 |
| | | | | 343/880 |
| 2016/0226551 A1* | 8/2016 | Brown | ............ | H01Q 1/281 |
| 2016/0285581 A1* | 9/2016 | Mickelson | ......... | H04B 10/516 |
| 2016/0311531 A1* | 10/2016 | Rios | ............. | B64C 39/024 |
| 2017/0026095 A1* | 1/2017 | Ashrafi | .......... | H04B 7/0456 |
| 2017/0171791 A1* | 6/2017 | Li | ............... | H04W 24/08 |

OTHER PUBLICATIONS

"LTE-Advanced (3GPP Release 10 and beyond)—RF aspects," [online] , [retrieved on Apr. 27, 2016] Workshop on LTE-Advanced Evaluation, Dec. 17-18, 2009, Beijing China. Retrieved from the Internet: <URL: ftp://www.3gpp.org/workshop/2009-12-17_ITU-R_IMT-Adv_eval/docs/pdf/REV-090006.pdf>.

* cited by examiner

WIRELESS COMMUNICATION UTILIZING POST-AMPLIFICATION CARRIER AGGREGATION

TECHNICAL FIELD

This disclosure generally relates to wireless communication systems.

BACKGROUND

A communication system may include wireless point-to-point communication links where a transmitter and a receiver communicate using wireless communication. A point-to-point link may be a one-way link where one station transmits information to another station, or a point-to-point link may be bidirectional where both stations transmit and receive information. A wireless-communications link may have a data rate above 1 megabit per second. A wireless transmitter and receiver can be separated by relatively short distances (e.g., 10 m to 1 km) or moderate to long distances (e.g., 1 km to 40,000 km) and can communicate using radio-frequency communications operating, for example, at any suitable frequency from approximately 300 kHz to approximately 300 GHz. As an example and not by way of limitation, an E-band communications link can operate in the 71-76 GHz or the 81-86 GHz range.

An unmanned aerial vehicle (UAV) may provide wireless internet connectivity to devices located on the ground. For example, a UAV may have an onboard communications module that wirelessly connects to the Internet (e.g., through a bidirectional link with a ground station), and a mobile computing device—such as a smartphone, tablet computer, or laptop computer—may wirelessly connect to the Internet through the UAV's communications module. A UAV may remain aloft for weeks, months, or years, and the UAV may provide access to the Internet and various data services (e.g., messaging, email, voice communication, social networking, search functions, health information, or weather information) to users located in a terrestrial area below the UAV.

SUMMARY OF PARTICULAR EMBODIMENTS

In particular embodiments, a bidirectional wireless communications link may be used to send data between two wireless stations. As an example and not by way of limitation, an airborne wireless station located at an altitude of approximately 60,000 feet may be connected to a ground-based wireless station by a bidirectional wireless link with a data rate of approximately 32 gigabits per second (Gbps) in each direction. In particular embodiments, a wireless link may be an E-band communications link having frequency range within approximately 71-76 GHz or 81-86 GHz. As an example and not by way of limitation, an airborne wireless station may transmit an RF signal with a frequency range within 71-76 GHz and may receive an RF signal with a frequency range within 81-86 GHz (or vice versa).

In particular embodiments, a 71-76 GHz transmitted signal may be formed by converting two or more channels of input digital data into two or more respective RF signals (which may be referred to as carriers). As an example and not by way of limitation, one 8-Gbps digital data channel may be converted into a 71-73 GHz RF signal, and another 8-Gbps digital data channel may be converted into a 74-76 GHz RF signal. Each RF signal is amplified separately by an RF amplifier, and then, after amplification, the amplified RF signals are combined (or, aggregated) together to form a 71-76 GHz communication signal. In particular embodiments, a communications system in which two or more RF signals are aggregated after each RF signal has been separately amplified may be referred to as a communications system that performs post-amplification carrier aggregation. The 71-76 GHz communication signal may have a data rate of 16 Gbps, corresponding to the data rates of the two aggregated 8-Gbps digital data channels. In particular embodiments, the 71-76 GHz communication signal may be configured to have a particular polarization (e.g., right-hand circular polarization), and it may be combined with another 71-76 GHz communication signal with an orthogonal polarization (e.g., left-hand circular polarization). When combined together and transmitted by an antenna, the two combined 71-76 GHz communication signals may result in a communication link with a data rate of 32 Gbps.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
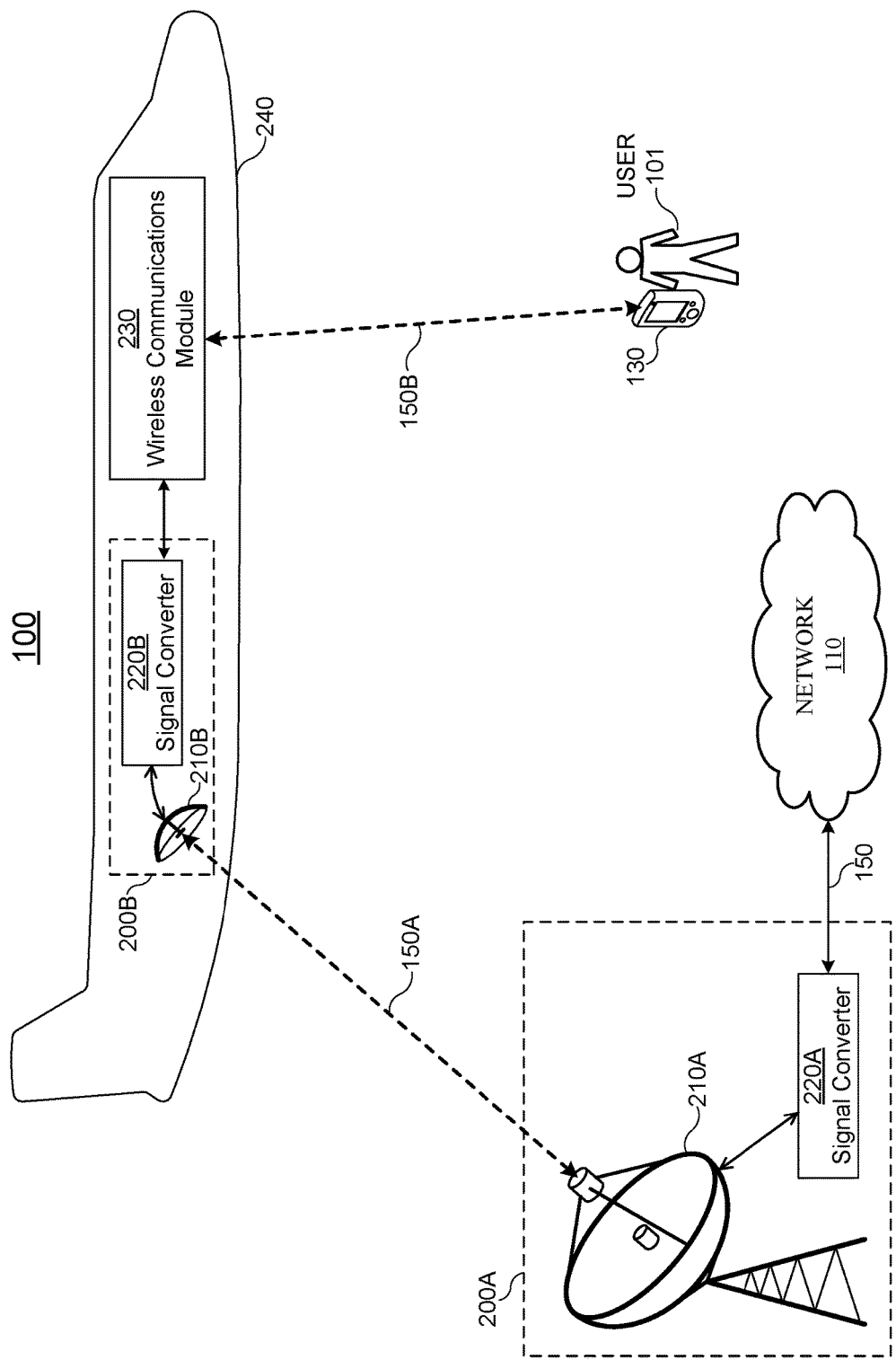
FIG. 1 illustrates an example network environment that includes a ground-based wireless station and an aerial wireless station connected by a wireless link.

FIG. 1 illustrates an example network environment 100 that includes a ground-based wireless station 200A and an aerial wireless station 200B connected by a wireless link 150A. In particular embodiments, a network environment 100 may include an unmanned aerial vehicle (UAV) 240 that provides wireless connectivity, through one or more links 150, to a network 110. As an example and not by way of limitation, one or more links 150 may connect client system 130 to UAV 240, and one or more other links 150 may connect UAV 240 to network 110. In the example of FIG. 1, client system 130 is connected to wireless communications module 230 by wireless link 150B, which may be a cellular or radio link. Ground-based wireless station 200A is connected to wireless station 200B of unmanned aerial vehicle (UAV) 240 by wireless link 150A, which may be a bidirectional link with a data rate of 1 to 100 gigabits per second (Gbps). Additionally, wireless station 200A is connected to network 110 by link 150, which may be a wireline, wireless, or optical (e.g., fiber optic or free space) link 150. Although FIG. 1 illustrates a particular arrangement of client system 130, links 150, wireless stations 200, and network 110, this disclosure contemplates any suitable arrangement of client system 130, links 150, wireless stations 200, and network 110. Moreover, although FIG. 1 illustrates a particular number of client systems 130, links 150, wireless stations 200, and networks 110, this disclosure contemplates any suitable number of client systems 130, links 150, wireless stations 200, and networks 110. As an example and not by way of limitation, network environment 100 may include multiple client systems 130, links 150, wireless stations 200, and networks 110.

This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example RF, Wi-Fi, or Worldwide Interoperability for Microwave Access (WiMAX)), or optical (such as for example free-space optical (FSO), Gigabit Ethernet (e.g., 10 Gigabit Ethernet) over optical fiber, Synchronous Optical Network (SONET), or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

In particular embodiments, a user 101 may access the Internet on a client system 130 through one or more links 150 provided by UAV 240. As an example and not by way of limitation, client system 130 may connect to UAV 240 via a wireless link 150B (e.g., a cellular or radio link), and then, through UAV 240, client system 130 may connect to the Internet via one or more other links 150 (e.g., via link 150A to a ground-based wireless station 200A, which is in turn connected to the Internet). In particular embodiments, user 101 may be an individual (human user), an entity (e.g., an enterprise, business, or third-party application), or a group (e.g., of individuals or entities) that interacts or communicates, at least in part, by a link 150 provided by UAV 240. Client system 130 may be any suitable computing device, such as, for example, a personal computer, a laptop computer, a cellular telephone, a smartphone, a tablet computer, or an augmented/virtual reality device. This disclosure contemplates any suitable client systems 130. A client system 130 may enable a network user at client system 130 to access network 110. A client system 130 may enable its user 101 to communicate with other users at other client systems 130. Although this disclosure describes and illustrates particular client systems accessing particular networks via particular links, this disclosure contemplates any suitable client systems accessing any suitable networks via any suitable links.

In particular embodiments, UAV 240 may be referred to as a drone, a remotely piloted aircraft, or an autonomous aircraft. In particular embodiments, UAV 240 may be a solar-powered aircraft configured to obtain at least some of its operating power from the sun and to remain aloft for weeks, months, or years. In particular embodiments, UAV 240 may be configured to fly at a cruising altitude within a range of approximately 3,000 feet to approximately 100,000 feet above sea level. As an example and not by way of limitation, UAV 240 may be configured to fly at an altitude within a range of approximately 60,000 to 70,000 feet above sea level. In particular embodiments, UAV 240 may be configured to fly along a particular flight path having a particular size, location, or shape (e.g., circular, figure eight, or elliptical). As an example and not by way of limitation, UAV 240 may be configured to fly along a substantially circular flight path having a diameter of approximately 0.5 miles, 1 mile, 2 miles, 5 miles, or any suitable diameter. As another example and not by way of limitation, UAV 240 may be configured to fly along a flight path that is located directly, partially, or substantially above a location of a ground-based wireless station 200A. Additionally, UAV 240 may include wireless communications module 230, which may provide wireless connectivity to the Internet for one or more client systems 130 located within range of wireless communications module 230. Although this disclosure describes and illustrates particular UAVs configured to fly at particular altitudes and along particular flight paths, this disclosure contemplates any suitable UAVs configured to fly at any suitable altitudes and along any suitable flight paths.

In particular embodiments, two wireless stations 200 may be directly connected to one another by a point-to-point wireless communications link 150 (which may be referred to as a point-to-point link 150, a wireless link 150, a communications link 150, a wireless communications link 150, or a link 150). In particular embodiments, a point-to-point link 150 may refer to a communications link 150 that directly and exclusively connects two stations 200 to one another. In particular embodiments, a point-to-point communications link 150 may be a one-way link 150 (e.g., information or signals are sent in one direction from a transmitting station 200 to a receiving station 200) or a bidirectional link 150 (e.g., information is sent in both directions between two stations 200). As an example and not by way of limitation, a bidirectional wireless link 150 between two wireless stations 200 may provide a data rate of 1-100 Gbps in each direction.

In particular embodiments, a wireless station 200 may be ground-based or airborne, and two wireless stations 200 connected by a point-to-point wireless link 150 may be located 1-40,000 km apart. As an example and not by way of limitation, two ground-based wireless stations 200 may be located 25 km apart and may be connected by a bidirectional wireless link 150 with a data rate of approximately 32 Gbps in each direction. In FIG. 1, a ground-based wireless station 200A is connected to an airborne wireless station 200B by a bidirectional wireless link 150A. Wireless link 150A may have a data rate of 30-40 Gbps in each direction, and wireless stations 200A and 200B may be separated by a distance of approximately 20-30 km. In particular embodiments, one or more wireless stations 200 may be located in a satellite operating in a low Earth orbit (LEO), medium Earth orbit (MEO), or a geostationary orbit (GEO). As an example and not by way of limitation, wireless station 200A may be ground-based, and wireless station 200B may be located in a GEO satellite with an altitude of approximately 35,800 km above mean sea level.

In particular embodiments, wireless stations 200 may communicate with one another using radio-frequency (RF) communications operating at any suitable frequency or range of frequencies from approximately 300 kHz to approximately 300 GHz. In particular embodiments, RF communications or wireless communications may refer to any suitable communications that involve the transmission or receipt of radio-frequency electromagnetic waves or signals having frequencies from approximately 300 kHz to approximately 300 GHz. In particular embodiments, radio-frequency electromagnetic waves or signals may be referred to as radio waves, RF waves, microwaves, microwave radiation, millimeter waves, millimeter radiation, or electromagnetic radiation.

In particular embodiments, a wireless link 150 may be an E-band communications link 150 having a frequency or a range of frequencies within approximately 71-76 GHz or approximately 81-86 GHz. In the example of FIG. 1, wireless stations 200A and 200B may be connected by a bidirectional E-band communications link 150A. Ground-based antenna 210A and signal converter 220A may be configured to transmit E-band communication signals within a 81-86 GHz range and receive E-band communication signals within a 71-76 GHz range. Additionally, airborne antenna 210B and signal converter 220B may be configured to transmit E-band communication signals within a 71-76 GHz range and receive E-band communication signals within a 81-86 GHz range. Although this disclosure describes and illustrates particular wireless stations 200 connected by particular wireless links 150 having particular frequency ranges, this disclosure contemplates any suitable wireless stations 200 connected by any suitable wireless links 150 having any suitable frequency ranges.

In particular embodiments, antenna 210A and antenna 210B may each be configured to simultaneously transmit or receive two communication signals having orthogonal polarizations. As an example and not by way of limitation, antenna 210B may simultaneously transmit a first communication signal having a right-hand circular (RHC) polarization and a second communication signal having a left-hand circular (LHC) polarization. As another example and not by way of limitation, antenna 210B may simultaneously transmit two communication signals having linear polarizations, where the polarizations of the two signals are orthogonal to one another (e.g., vertical and horizontal polarizations). The signals corresponding to the two polarizations may be combined or separated by a polarization duplexer (e.g., an orthomode transducer) located in signal converter 220. In particular embodiments, a link 150 with a total data rate of R Gbps may be achieved by transmitting two orthogonal signals, each signal having a data rate of R/2 Gbps. As an example and not by way of limitation, a 32-Gbps link 150 may include two orthogonal signals (e.g., a RHC-polarized signal and a LHC-polarized signal), each signal having a data rate of 16 Gbps.

In the example of FIG. 1, wireless station 200A includes antenna 210A and signal converter 220A, and wireless station 200B includes antenna 210B and signal converter 220B. Antenna 210A and antenna 210B may each be configured to transmit and receive wireless signals to form a bidirectional wireless link 150A. In particular embodiments, a signal converter 220 may convert a digital signal into an RF signal for transmission, and a signal converter 220 may convert a received RF signal into a digital signal. In particular embodiments, a signal converter 220 may be configured to perform one or more operations on a received digital or RF signal. In particular embodiments, a signal converter 220 may be configured to amplify, modulate, demodulate, encode, combine (or, multiplex or aggregate), separate (or, demultiplex), convert, mix, transform, filter, process, or modify one or more signals. As an example and not by way of limitation, a signal converter 220 may receive an input digital signal (e.g., a stream of digital data supplied by network 110 or wireless communications module 230). The signal converter 220 may convert the digital signal into an RF signal, amplify the RF signal, and then aggregate the amplified RF signal with one or more other amplified RF signals to produce a communication signal for transmission by an antenna 210.

In the example of FIG. 1, signal converter 220B may receive a digital signal from wireless communications module 230, and signal converter 220B may convert the digital signal to an RF signal, amplify the RF signal, and then aggregate the amplified RF signal with one or more other amplified RF signals to produce a communication signal. Then, signal converter 220B may send the resulting communication signal to antenna 210B for transmission to antenna 210A. Additionally, antenna 210B may receive a communication signal transmitted by antenna 210A. Antenna 210B may send the received communication signal to signal converter 220B which separates (or, demultiplexes) the communication signal into its constituent RF signals, amplifies each RF signal, and converts each RF signal into a digital signal. In the example of FIG. 1, signal converter 220A may perform similar signal-conversion operations to digital signals received from network 110 (e.g., convert a digital signal to an RF signal, amplify the RF signal, and multiplex the RF signal with other amplified RF signals to produce a communication signal for transmission by antenna 210A) and similar signal-conversion operations to communication signals received from antenna 210A (e.g., demultiplex a received communication signal into its constituent RF signals, amplify each RF signal, and convert each RF signal into a digital signal). Although this disclosure describes and illustrates particular signal converters configured to perform particular operations on particular signals, this disclosure contemplates any suitable signal converters configured to perform any suitable operations on any suitable signals.

Figure 2:
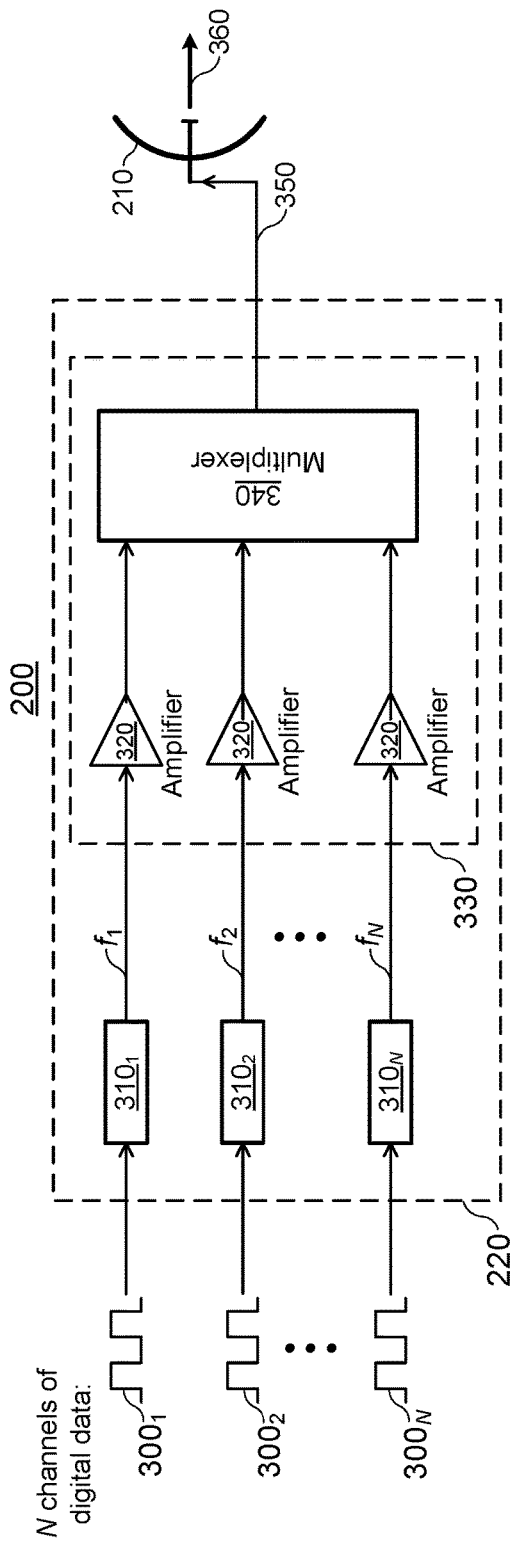
FIG. 2 illustrates an example wireless station with an example signal converter and an example antenna.

FIG. 2 illustrates an example wireless station 200 with an example signal converter 220 and an example antenna 210. In the example of FIG. 2, N channels of input digital data ($300_1$, $300_2$, . . . $300_N$) are converted into respective RF signals ($f_1$, $f_2$, . . . $f_N$) by respective digital-to-RF modules ($310_1$, $310_2$, . . . $310_N$). In particular embodiments, an amplifier/multiplexer module 330 may receive the RF signals ($f_1$, $f_2$, . . . $f_N$), where each input RF signal is received on a separate input channel, and each input RF signal has a different frequency range. In particular embodiments, two or more RF signals having different frequency ranges may refer to two or more RF signals that each have a different carrier or center frequency or that each have a frequency range that does not overlap with the frequency ranges of the other RF signals. In the amplifier/multiplexer module 330, each RF signal ($f_1, f_2, \ldots f_N$) is amplified separately by an RF amplifier 320 to produce two or more respective amplified RF signals. The amplified RF signals are then aggregated together in multiplexer 340 to form a communication signal 350 which is transmitted by antenna 210. As an example and not by way of limitation, the RF signals $f_1, f_2, \ldots f_N$ may correspond to parallel data streams for an orthogonal frequency-division multiplexing (OFDM) communication scheme. After being separately amplified, the amplified RF signals may be combined together in multiplexer 340 to form an OFDM communication signal 350. In particular embodiments, multiplexer 340 may be referred to as a multiplexer/demultiplexer module 340 or as Mux/Demux module 340.

In particular embodiments, a communication signal 350 may include an aggregation of two or more amplified RF signals, where each amplified RF signal has a different frequency range and corresponds to a particular stream of digital data 300. In particular embodiments, a communication signal 350 may refer to an RF signal that is fed to an antenna 210 and transmitted by the antenna 210 as a transmitted communication signal 360. As an example and not by way of limitation, communication signal 350 may be an electromagnetic signal that propagates in a microwave transmission line or waveguide (e.g., a hollow or coaxial metallic waveguide) to antenna 210 where it is transmitted as transmitted communication signal 360 (e.g., transmitted as a free-space electromagnetic wave or signal). In particular embodiments, aggregated communication signal 350 may be transmitted through a single antenna aperture as a transmitted communication signal 360. As an example and not by way of limitation, antenna 210 may be an aperture-type antenna that includes an aperture to emit communication signal 350. As another example and not by way of limitation, antenna 210 may be a parabolic antenna, a horn antenna, a slot antenna, or a dielectric-resonator antenna.

In particular embodiments, signal converter 220 may convert two or more input digital signals 300 into an RF communication signal 350 for transmission by antenna 210. In particular embodiments, signal converter 220 may include two or more digital-to-RF modules ($310_1$, $310_2, \ldots 310_N$) and one or more amplifier/multiplexer modules 330. Signal converter 220 may be configured to perform one or more operations on received signals, such as for example, amplification, modulation, demodulation, encoding, combining (or, multiplexing or aggregating), separating (or, demultiplexing), converting, mixing, transforming, filtering, processing, or modifying. In the example of FIG. 2, each digital data signal ($300_1, 300_2, \ldots 300_N$) is received by a respective digital-to-RF module ($310_1$, $310_2, \ldots 310_N$), which modulates and upconverts the data signal to produce an RF signal ($f_1, f_2, \ldots f_N$). In FIG. 2, the RF signals ($f_1, f_2, \ldots f_N$) are received by the amplifier/multiplexer module 330, which separately amplifies each RF signal with an amplifier 320 and then multiplexes the amplified RF signals together to produce communication signal 350.

In particular embodiments, the number of channels N that are processed by signal converter 220 and amplifier/multiplexer module 330 may be 2, 3, 4, or any suitable number of channels. In particular embodiments, signal converter 220 may be a two-channel device that receives digital data $300_1$ and $300_2$ on two input channels (e.g., N=2), and amplifier/multiplexer module 330 may receive two corresponding RF signals ($f_1$ and $f_2$) from digital-to-RF modules $310_1$ and $310_2$, respectively. Digital data $300_1$ and $300_2$ may each have a bit rate of 8 Gbps, and digital-to-RF modules $310_1$ and $310_2$ may each convert the respective input digital data to a corresponding RF signal having a bandwidth of approximately 2 GHz. Each of the RF signals may have a different center frequency and a different, non-overlapping frequency range. As an example and not by way of limitation, digital data $300_1$ may be converted into an E-band RF signal $f_1$ having a frequency range of approximately 71-73 GHz, and digital data $300_2$ may be converted into an E-band RF signal $f_2$ having a frequency range of approximately 74-76 GHz. After amplification, the two amplified RF signals may be multiplexed together to produce an E-band communication signal 350 with a frequency range of approximately 71-76 GHz. The E-band communication signal 350 may have an associated data rate of 16 Gbps, corresponding to a sum of the data rates for the two 8-Gbps input digital data channels. As another example and not by way of limitation, digital data $300_1$ may be converted into an E-band RF signal $f_1$ having a frequency range of approximately 81-83 GHz, and digital data $300_2$ may be converted into an E-band RF signal $f_2$ having a frequency range of approximately 84-86 GHz. After amplifying the two RF signals separately, the two amplified RF signals may be multiplexed to produce an E-band communication signal 350 with a frequency range of approximately 81-86 GHz (and a corresponding data rate of 16 Gbps).

In particular embodiments, signal converter 220 may be a four-channel device that receives digital data on four input channels (e.g., N=4). The four channels may each include digital data with a bit rate of 4 Gbps, and four respective digital-to-RF modules (e.g., $310_1$, $310_2$, $310_3$, and $310_4$) may each convert the respective input digital data to an RF signal having a bandwidth of approximately 1 GHz. As an example and not by way of limitation, four 4-Gbps digital data channels may be converted to four E-band RF signals having respective frequency ranges of approximately 71-72.25 GHz, 72.25-73.5 GHz, 73.5-74.725 GHz, and 74.725-76 GHz. The four E-band RF signals may be amplified separately and then multiplexed together to produce an E-band communication signal 350 with a frequency range of approximately 71-76 GHz. The E-band communication signal 350 may have an associated data rate of 16 Gbps, corresponding to a sum of the data rates for the four 4-Gbps input digital data channels. As another example and not by way of limitation, four 4-Gbps digital data channels may be converted to four E-band RF signals having respective frequency ranges of approximately 81-82.25 GHz, 82.25-83.5 GHz, 83.5-84.725 GHz, and 84.725-86 GHz. After amplifying the four RF signals separately, the four amplified RF signals may be multiplexed to produce an E-band communication signal 350 with a frequency range of approximately 81-86 GHz (and a corresponding data rate of 16 Gbps). Although this disclosure describes and illustrates particular signal converters having particular numbers of channels with particular data rates and particular frequency ranges, this disclosure contemplates any suitable signal converters having any suitable numbers of channels with any suitable data rates and any suitable frequency ranges.

In particular embodiments, the RF signals ($f_1, f_2, \ldots f_N$) may include a guard band between adjacent channels where a guard band refers to a frequency gap or range that separates two adjacent channels and does not include any other channels. The RF signals may include input RF signals $f_1$ and $f_2$ where input RF signal $f_1$ has a frequency range of approximately $f_A$ to $f_B$ (where $f_A<f_B$), and input RF signal $f_2$ has a frequency range of approximately $f_C$ to $f_D$ (where $f_C<f_D$). In particular embodiments, the input RF signals $f_1$ and $f_2$ may include a guard band so that $f_B$ is less than $f_C$, and the guard band corresponds to the frequency range of $f_B$ to $f_C$. As an example and not by way of limitation, a first input RF signal may have a frequency range of approximately 71-73 GHz (e.g., $f_A$=71 GHz and $f_B$=73 GHz), and a second input RF signal may have a frequency range of approximately 74-76 GHz (e.g., $f_C$=74 GHz and $f_D$=76 GHz). The two RF signals are separated by a 1-GHz guard band with a frequency range of 73 GHz to 74 GHz. As another example and not by way of limitation, a first input RF signal may have a frequency range of approximately 81-82.2 GHz (e.g., $f_A$=81 GHz and $f_B$=82.2 GHz), and a second input RF signal may have a frequency range of approximately 82.3-83.5 GHz (e.g., $f_C$=82.3 GHz and $f_D$=83.5 GHz). The two RF signals are separated by a 0.1-GHz guard band with a frequency range of 82.2 GHz to 82.3 GHz. In particular embodiments, there may be no guard band separating input RF signals $f_1$ and $f_2$ so that $f_B$ is approximately equal to $f_C$. As an example and not by way of limitation, a first input RF signal may have a frequency range of approximately 81-83.5 GHz (e.g., $f_A$=81 GHz and $f_B$=83.5 GHz), and a second input RF signal may have a frequency range of approximately 83.5-86 GHz (e.g., $f_C$=83.5 GHz and $f_D$=86 GHz). The two RF signals are not separated by a guard band since $f_B$ is equal to $f_C$ and there is no gap in frequency between the two RF signals. Although this disclosure describes and illustrates particular RF signals separated by particular guard bands, this disclosure contemplates any suitable RF signals separated by any suitable guard bands.

In particular embodiments, amplifier 320 may be an RF power amplifier configured to operate at 71-76 GHz or 81-86 GHz. In particular embodiments, the average input power of an E-band RF signal received by amplifier 320 may be approximately 0.01 mW to approximately 100 mW, and the average output power of an amplified RF signal produced by amplifier 320 may be approximately 10 mW to approximately 50 W. As an example and not by way of limitation, an input E-band RF signal may have an average power of 10 mW, and the average output power (after amplification by amplifier 320) may be 3 W. In particular embodiments, amplifier 320 may consume approximately 10-20 W during operation and may have a power-added efficiency (PAE) of greater than or equal to approximately 1%. As another example and not by way of limitation, amplifier 320 may have a PAE of approximately 10% to approximately 20%. Power-added efficiency may be expressed as $PAE=(P_{RF-out}-P_{RF-in})/P_{DC}$, where $P_{RF-out}$ is the average RF output power of amplifier 320, $P_{RF-in}$ is the average input power, and $P_{DC}$ is the direct-current (DC) or average power consumed by amplifier 320. In particular embodiments, amplifier 320 may be a semiconductor-based amplifier, such as for example, an amplifier made, at least in part, from gallium nitride (GaN), gallium arsenide (GaAs), or silicon germanium (SiGe), or an amplifier with a silicon on insulator/complementary metal-oxide-semiconductor (SOI/CMOS) structure. As an example and not by way of limitation, amplifier 320 may include a GaN-based pseudomorphic high-electron-mobility transistor (pHEMT). As another example and not by way of limitation, amplifier 320 may include a monolithic microwave integrated circuit (MMIC) fabricated using GaN or GaAs. In particular embodiments, amplifier 320 may be a traveling-wave tube (TWT) amplifier (TWTA) in which an RF signal is amplified by absorbing power from a beam of electrons traveling within a vacuum tube. Although this disclosure describes and illustrates particular amplifiers with particular characteristics, this disclosure contemplates any suitable amplifiers with any suitable characteristics.

Figure 4:
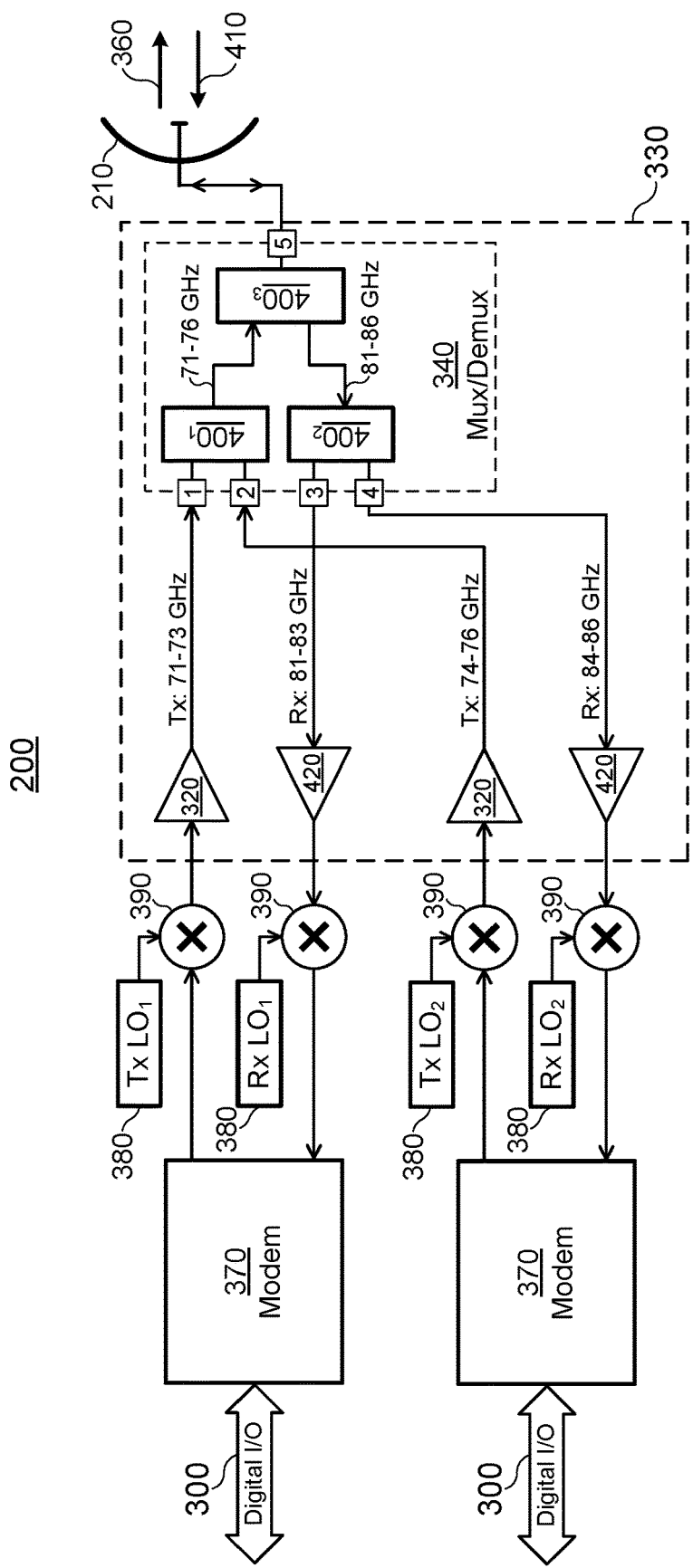
FIG. 4 illustrates an example bidirectional wireless station with two input/output channels.

In particular embodiments, an amplifier/multiplexer module 330 as illustrated in FIGS. 2 and 4 may be referred to as a system that performs post-amplification carrier aggregation. Similarly, a wireless link 150 with an amplifier/multiplexer module 330 as illustrated and described herein may be referred to as a link 150 that performs wireless communication utilizing post-amplification carrier aggregation. In particular embodiments, carrier aggregation may refer to a process where two or more RF signals (which may be referred to as carriers or channels) are aggregated (or, combined or multiplexed) together into a single communication signal 350. In particular embodiments, aggregation may be referred to as combining or multiplexing, and carrier aggregation may be referred to as signal aggregation, signal combining, signal multiplexing, carrier combining, carrier multiplexing, channel aggregation, channel combining, or channel multiplexing. A post-amplification carrier aggregation process refers to a process where two or more RF signals are aggregated after they have each been separately amplified. As illustrated in FIG. 2, each RF signal ($f_1$, $f_2$, ... $f_N$) is first amplified separately by an amplifier 320, and after each RF signal is amplified, the amplified RF signals are then combined by multiplexer 340 (e.g., the RF signals are combined post-amplification).

Previous communication systems may employ a pre-amplification carrier-aggregation process where RF signals are first aggregated together to form a combined RF signal, and then the combined RF signal is amplified using a single RF power amplifier. A wireless E-band link 150 that utilizes post-amplification carrier aggregation as described and illustrated herein may offer advantages in terms of increased efficiency, reduced power consumption, or reduced back-off with respect to other communication systems that utilize pre-amplification carrier aggregation. In a post-amplification carrier-aggregation communication system, the amplifiers 320 used to amplify the RF signals may operate with higher efficiency (e.g., higher PAE), lower power consumption, or a reduced back-off compared to an amplifier used to amplify an aggregated signal in a pre-amplification carrier aggregation system. As an example and not by way of limitation, the two amplifiers 320 in a two-channel post-amplification carrier-aggregation system (as described herein and illustrated in FIGS. 2 and 4) may together consume approximately 1.4 to 2 times less power than the single amplifier in a comparable two-channel pre-amplification carrier-aggregation system. As another example and not by way of limitation, the two amplifiers 320 in a two-channel post-amplification carrier-aggregation system may each operate with a PAE of 10% to 20%, and the single amplifier in a comparable two-channel pre-amplification carrier-aggregation system may operate with a PAE of 5% to 9%. The single amplifier in a pre-amplification carrier-aggregation system may operate with a larger peak-to-average power ratio (PAPR) than each amplifier 320 in a post-amplification carrier-aggregation system. A PAPR value for an RF signal may equal the ratio of the signal's peak power to its average power. As an example and not by way of limitation, the single amplifier in a two-channel pre-amplification carrier-aggregation system may operate with approximately 3-dB greater PAPR than each amplifier 320 in a two-channel post-amplification carrier-aggregation system. As a result of this difference in PAPR, each of the two amplifiers 320 in a two-channel post-amplification carrier aggregation system may operate with approximately 3-dB less back-off than the single amplifier in a pre-amplification carrier aggregation system. In particular embodiments, back-off refers to an amount by which an input or output power of an amplifier is reduced to avoid or reduce unwanted gain compression associated with an amplifier's nonlinear behavior near its saturation point.

A pre-amplification carrier aggregation communication system may be compared to a post-amplification carrier aggregation system (as described and illustrated herein) in an application where both systems are required to deliver a certain high capacity at a certain long range. From a link budget point of view the single power amplifier (PA) in pre-amplification carrier aggregation communication system has to provide 3 dB greater output power than the output power of each amplifier 320 in the post-amplification carrier aggregation communication system. Additionally due to the increased PAPR, to guarantee the same linearity the power amplifier in the pre-amplification carrier aggregation communication system will need to have approximately 3 dB greater back-off than the amplifiers 320 in the post-amplification carrier aggregation communication system. This implies that in order to meet the same capacity and range objective under similar spectrum availability constraints, the power amplifier in the pre-amplification carrier aggregation communication will need to have 6 dB higher saturated power ($P_{sat}$) than the amplifiers 320 in the post-amplification carrier aggregation system. For high capacity communication systems (e.g., data rates greater than 1 Gbps), the availability of usable spectrum dictates the choice of carrier frequencies in the frequency regime from approximately 20 GHz to 300 GHz. At these frequencies, the $P_{sat}$ of MMIC power amplifiers may be limited by the current semiconductor technologies. A power amplifier with 6 dB higher $P_{sat}$ (e.g., which may be required for a pre-amplification carrier-aggregation system) could be above the technology barrier and may not be feasible or realizable. Post-amplification carrier-aggregation techniques, as described and illustrated herein, may use multiple smaller amplifiers 320 instead of a single large power amplifier in the case of pre-amplification carrier aggregation and thus may be more efficient from the point of view of DC-power consumption of the communication system and may be able to overcome the challenge of designing high $P_{sat}$ amplifiers for carrier frequencies in the 20 GHz to 300 GHz range.

In a communication system (as described and illustrated herein) that uses post-amplification carrier aggregation (which may be referred to as post-amplifier multiplexing) on the transmitter side and pre-amplifier demultiplexing on the receiver side, a received signal from an antenna may be demultiplexed into two or more spectrum channels using a passive mux-demux device (e.g., Mux/Demux module 340). The two or more demultiplexed signals may be separately amplified via independent low-noise amplifiers and independently down-converted to baseband. An alternative architecture may use a single low-noise amplifier (LNA) to amplify the signal received from the antenna and demultiplex the two or more constituent channels after the LNA. In this alternate architecture, the LNA may be required to have a much wider band performance than the LNAs in a post-amplifier multiplexing and pre-LNA demultiplexing communication system. Guaranteeing a certain noise figure and gain performance over a wider bandwidth is significantly harder than achieving the same performance over a narrower bandwidth. Additionally, it may be possible to tune the LNA to achieve better performance if the bandwidth to be supported is narrower. In a post-amplifier multiplexing and pre-LNA demultiplexing communication system, the front-end insertion loss of the multiplexer/demultiplexer may be an important consideration for the energy efficiency of the overall communication system. In particular embodiments, a waveguide multiplexing/demultiplexing device (e.g., Mux/Demux module 340) may have a low insertion loss (e.g., less than 0.6 dB) and a high power-handling capability (e.g., up to 100 Watts).

Previous communications systems may use an inter-band carrier aggregation technique that performs carrier aggregation to achieve a wider available bandwidth, but such a system may exhibit an inferior PAPR due to carrier aggregation before the PA. Previous communication systems may also be limited to particular channel bandwidths and carrier frequencies (e.g., channel bandwidths below 20 MHz and carrier frequencies below 6 GHz), while a post-amplifier carrier-aggregation system as described and illustrated herein may not be subject to such restrictions. Additionally, a previous communication system may use a surface acoustic wave/thin-film bulk acoustic resonator filter (SAW/FBAR filter), which typically has an insertion loss of 2-3 dB. A communication link with two such SAW/FBAR filters (e.g., one filter at a transmitter and one filter at a receiver) may require four or more power amplifiers to be combined for any effective PAPR reduction without losing link margin. A post-amplifier carrier-aggregation system as described and illustrated herein may use a waveguide-based multiplexing/demultiplexing device which has lower insertion loss (e.g., insertion loss less than 0.6 dB) and provides effective band separation.

Figure 3:
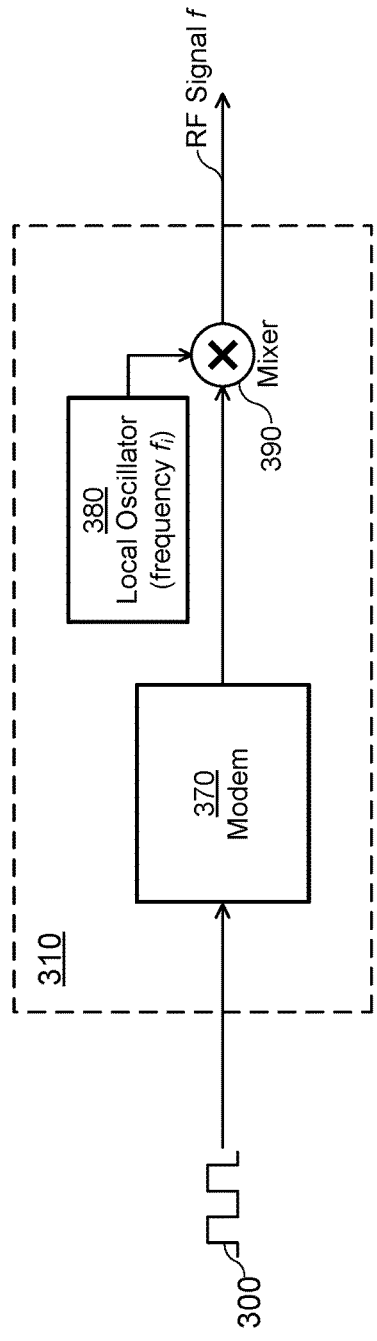
FIG. 3 illustrates an example digital-to-RF module.

FIG. 3 illustrates an example digital-to-RF module 310. In particular embodiments, digital-to-RF module 310 may perform a digital-to-RF conversion of an input digital signal 300. Digital-to-RF module 310 may receive an input digital signal 300 and convert digital signal 300 into an RF signal f where RF signal f is a modulated and frequency-upconverted signal corresponding to digital signal 300. As an example and not by way of limitation, digital signal 300 may have a bit rate of 8 Gbps, and RF signal f (which corresponds to digital signal 300) may have a center frequency of 72 GHz and a 2-GHz bandwidth. In particular embodiments, digital-to-RF module 310 may include modem 370, local oscillator 380, and mixer 390. In particular embodiments, modem 370 (which may be referred to as a modulator-demodulator device) may perform a modulation operation based on digital signal 300 to produce a modulated analog signal. As an example and not by way of limitation, digital signal 300 may have a bit rate of 8 Gbps, and modem 370 may convert digital signal 300 into a baseband or intermediate-frequency analog signal having a 2-GHz bandwidth. In particular embodiments, modem 370 may modulate digital signal 300 according to any suitable modulation scheme, such as for example, phase-shift keying (PSK), frequency-shift keying (FSK), amplitude-shift keying (ASK), or quadrature amplitude modulation (QAM). As an example and not by way of limitation, modem 370 may perform a modulation based on 16-QAM, 32-QAM, 64-QAM, or 256-QAM. The output signal produced by modem 370 may be an analog baseband modulated signal.

In particular embodiments, the analog baseband modulated signal produced by modem 370 may be fed to a mixer 390 where it is mixed with a local oscillator 380 to produce a frequency-upconverted signal. As an example and not by way of limitation, an analog signal with a 1-GHz bandwidth may be mixed with a 72-GHz local oscillator 380 to produce an upconverted RF signal f with a center frequency of 72 GHz and a 1-GHz bandwidth (e.g., RF signal f may have a 71.5-72.5 GHz frequency range). In particular embodiments, a local oscillator 380 (which may be referred to as an RF carrier) may include an electronic device configured to produce a substantially sinusoidal electronic signal at a particular frequency. In particular embodiments, local oscillator 380 may be configured to operate at any suitable frequency, such as for example at any suitable E-band frequency (e.g., any suitable frequency in the range of 71-76 GHz or 81-86 GHz). In particular embodiments, signal converter 220 may include two or more local oscillators 380, each local oscillator operating at a different frequency. As an example and not by way of limitation, signal converter 220 may include two local oscillators 380, one operating at approximately 72 GHz and another operating at approximately 75 GHz. As another example and not by way of limitation, signal converter 220 may include four local oscillators 380 operating at approximately 81.6 GHz, 82.8 GHz, 84.1 GHz, and 85.4 GHz, respectively. In particular embodiments, signal converter 220 may include two or more digital-to-RF modules ($310_1$, $310_2$, ... $310_N$) configured to receive two or more respective independent data streams ($300_1$, $300_2$, ... $300_N$). The modems 370 of digital-to-RF modules ($310_1$, $310_2$, ... $310_N$) may modulate the two or more independent data streams ($300_1$, $300_2$, ... $300_N$) to generate two or more respective independent analog baseband modulated signals. In particular embodiments, each of the two or more independent analog baseband modulated signals may be upconverted using two or more respective local oscillators 380 to produce the RF signals ($f_1$, $f_2$, ... $f_N$). The analog signals may be upconverted by mixing each analog signal with a sinusoidal carrier signal (with frequency f) from a local oscillator 380, where each local oscillator 380 is operating at a different frequency. In particular embodiments, in addition to or instead of performing a digital-to-RF conversion of an input digital signal, digital-to-RF module 300 may perform an RF-to-digital conversion. As an example and not by way of limitation, digital-to-RF module 300 may be configured to receive an input RF signal, down-convert the RF signal by mixing it with a local oscillator, and perform a demodulation operation to recover a digital data stream.

FIG. 4 illustrates an example bidirectional wireless station 200 with two input/output channels 300. In the example of FIG. 4, wireless station 200 includes two modems 370, two transmit-channel local oscillators 380 (e.g., Tx $LO_1$ and Tx $LO_2$), two receive-channel local oscillators 380 (e.g., Rx $LO_1$ and Rx $LO_2$), two transmit-channel amplifiers 320, two receive-channel amplifiers 420, a multiplexer/demultiplexer (Mux/Demux) module 340, and an antenna 210. Wireless station 200 may be part of a point-to-point bidirectional communication link 150 where antenna 210 transmits communication signal 360 to another wireless station 200 (e.g., a wireless station 200 located 20-50 km away) and receives a communication signal 410 from the other wireless station 200. As an example and not by way of limitation, transmitted communication signal 360 and received communication signal 410 may each have a data rate of approximately 8, 16, or 32 Gbps. In the example of FIG. 4, each modem 370 sends and receives digital data on a digital input/output (digital I/O) channel 300. As an example and not by way of limitation, digital I/O channel 300 may be a 10 Gigabit Ethernet channel, and each modem 370 may be configured to send and receive data using a Gigabit Ethernet protocol. The input digital data stream 300 received by each modem 370 may be modulated, frequency upconverted, amplified, and combined together by wireless station 200 to form transmitted communication signal 360. Additionally, the received communication signal 410 may be demultiplexed, amplified, frequency down-converted, and converted into two output digital data streams 300 by wireless station 200. Although this disclosure describes and illustrates particular wireless stations 200 that include particular components configured to operate at particular frequencies or data rates, this disclosure contemplates any suitable wireless stations 200 that include any suitable components configured to operate at any suitable frequencies or data rates.

Wireless station 200 illustrated in FIG. 4 may be part of a ground-based wireless station (similar to wireless station 200A in FIG. 1) or part of an airborne wireless station (similar to wireless station 200B in FIG. 1). In FIG. 4, wireless station 200 is configured to amplify, multiplex, and transmit RF signals in the 71-76 GHz frequency range. Wireless station 200 is also configured to receive, demultiplex, and amplify RF signals in the 81-86 GHz frequency range. In particular embodiments, wireless station 200 illustrated in FIG. 4 may be an airborne wireless station connected by a wireless link 150 to a ground-based wireless station 200. The ground-based wireless station may be configured to amplify, multiplex, and transmit (to airborne wireless station 200) RF signals in the 81-86 GHz frequency range. Additionally, the ground-based wireless station 200 may also be configured to receive (from airborne wireless station 200), demultiplex, and amplify RF signals in the 71-76 GHz range.

In the example of FIG. 4, two input digital data streams 300 are each converted into a modulated analog signal by modems 370, and the modulated analog signals are upconverted by local oscillator 380 and mixer 390 to produce two RF signals which are amplified by amplifiers 320 (which may be referred to as transmit-channel amplifiers 320). Local oscillator Tx $LO_1$ may have a frequency of approximately 72 GHz, and the resulting RF signal may have frequency range of approximately 71-73 GHz. Local oscillator Tx $LO_2$ may have a frequency of approximately 75 GHz, and the resulting RF signal may have a frequency range of approximately 74-76 GHz. After the two RF signals are amplified, they are aggregated together in Mux/Demux module 340 and sent to antenna 210 for transmission as an E-band communication signal 360 which has a frequency range of approximately 71-76 GHz. Each input digital data stream may have a data rate of 7.5-10 Gbps, and the transmitted communication signal 360 may have a data rate of 15-20 Gbps. As an example and not by way of limitation, each input digital data stream may have a 8-Gbps data rate, and the transmitted communication signal 360 may have a 16-Gbps data rate.

In particular embodiments, wireless station 200 may receive at least a portion of a transmitted communication signal 360. As an example and not by way of limitation, another wireless station may transmit a communication signal 360, and antenna 210 of wireless station 200 may receive at least a portion of the transmitted signal as a received communication signal 410. In particular embodiments, Mux/Demux module 340 may separate the received communication signal 410 into two or more constituent RF signals. In particular embodiments, each of the constituent RF signals may be amplified by an amplifier 420, and each of the two or more constituent RF signals may be down-converted using two or more respective local oscillators 380 to produce two or more independent analog baseband signals. Each local oscillator 380 may have a different frequency that corresponds to a frequency of a local oscillator 380 (used for upconversion) of a wireless station 200 that transmitted the communication signal 360. In particular embodiments, each analog baseband signal may be demodulated by a modem 370 to produce two or more respective independent bit streams 300. In the example of FIG. 4, received communication signal 410 may be an E-band signal with a frequency range of approximately 81-86 GHz. The received communication signal 410 is demultiplexed by Mux/Demux module 340 to produce two RF signals with respective frequency ranges 81-83 GHz and 84-86 GHz. Each RF signal is amplified by an amplifier 420 which may be a low-noise amplifier (LNA), such as for example, a low-noise E-band amplifier, and may be referred to as a receive-channel amplifier 420. After amplification, the RF signals are down-converted by local oscillator 380 and mixer 390 to produce two modulated analog baseband signals. Local oscillator Rx $LO_1$ may have a frequency of approximately 82 GHz, and local oscillator Rx $LO_2$ may have a frequency of approximately 85 GHz. The two modulated analog signals are then converted into two respective output digital data streams by modems 370. As an example and not by way of limitation, the received communication signal 410 may have a 16-Gbps data rate, and each output digital data stream may have a 8-Gbps data rate.

In particular embodiments, Mux/Demux module 340 may aggregate (or, multiplex) two or more amplified RF signals into one aggregated communication signal 350. In particular embodiments, Mux/Demux module 340 may be a passive device that multiplexes or demultiplexes RF signals based on the frequencies of the RF signals. In particular embodiments, a passive device may refer to an RF device that does not use or require an external source of electrical power to operate. As an example and not by way of limitation, Mux/Demux module 340 may be a passive waveguide multiplexer with an insertion loss of less than 1 dB. Insertion loss refers to the power loss or attenuation experienced by an RF signal as it propagates through a device. A Mux/Demux module 340 with an insertion loss of less than 0.6 dB will cause a power loss of less than approximately 13%. In particular embodiments, Mux/Demux module 340 may be a passive waveguide multiplexer that includes a metallic waveguide (e.g., a hollow metallic waveguide) or a substrate integrated waveguide (SIW). As an example and not by way of limitation, Mux/Demux module 340 may be a SIW-type structure (which may be referred to as a post-wall waveguide or a laminated waveguide) that includes a dielectric substrate with a waveguide formed in the substrate by an array of metallized posts or via-holes connecting upper and lower metal plates of the substrate. In the example of FIG. 4, Mux/Demux module 340 has five ports (labeled 1, 2, 3, 4, and 5). Ports 1 and 2 are configured to receive amplified RF signals in the 71-73 GHz and 74-76 GHz range, respectively, and Mux/Demux module 340 multiplexes these signals into a 71-76 GHz signal (e.g., communication signal 360) which is sent out port 5 and transmitted by antenna 210. Additionally, port 5 receives a 81-86 GHz signal (e.g., received communication signal 410) from antenna 210, and Mux/Demux module 340 demultiplexes this RF signal into a 81-83 GHz signal (which is sent out port 3) and a 84-86 GHz signal (which is sent out port 4).

In particular embodiments, Mux/Demux module 340 may be a reciprocal device that may perform multiplexing in one direction or demultiplexing in the reverse direction. As illustrated in FIG. 4, the RF signals provided at ports 1 and 2 are multiplexed and sent out port 5. A similar Mux/Demux module 340 may also be used in another wireless station 200 where a 71-76 GHz signal is received at port 5, and the Mux/Demux module 340 demultiplexes the received signal into a 71-73 GHz signal (which is sent to port 1) and a 74-76 GHz signal (which is sent to port 2). Similarly, rather than demultiplexing a received 81-86 GHz communication signal 410, as illustrated in FIG. 4, a Mux/Demux module 340 (e.g., in another wireless station 200 that communicates with wireless station 200 illustrated in FIG. 4) may multiplex a 81-83 GHz signal (at port 3) and a 84-86 GHz signal (at port 4) into a 81-86 GHz signal for transmission. Although this disclosure describes and illustrates particular multiplexer/demultiplexer modules configured to multiplex or demultiplex particular numbers of signals having particular frequency ranges, this disclosure contemplates any suitable multiplexer/demultiplexer modules configured to multiplex or demultiplex any suitable numbers of signals having any suitable frequency ranges.

In the example of FIG. 4, Mux/Demux module 340 includes three diplexers $400_1$, $400_2$, and $400_3$. In particular embodiments, a diplexer 400 may refer to a passive device that aggregates, combines, separates, or routes RF signals based on the frequencies of the RF signals. In particular embodiments, a diplexer 400 may be referred to as a frequency multiplexer or a frequency-domain multiplexer. In FIG. 4, each diplexer is a three-port device configured to aggregate two input RF signals with different frequency ranges into a single output RF signal or to separate an input RF signal into two output RF signals with different frequency ranges. Diplexer $400_1$ receives a 71-73 GHz RF signal (from port 1) and a 74-76 GHz RF signal (from port 2) and combines the two RF signals into one 71-76 GHz RF signal. Diplexer $400_2$ receives a 81-86 GHz RF signal and separates it into a 81-83 GHz RF signal (which is sent to port 3) and a 84-86 GHz RF signal (which is sent to port 4). Diplexer $400_3$ may be used to route a 71-76 GHz RF signal and a 81-86 GHz RF signal. In FIG. 4, diplexer $400_3$ receives a 71-76 GHz RF signal from diplexer $400_1$ and routes the signal to port 5, and diplexer $400_3$ receives a 81-86 GHz RF signal from port 5 and routes the signal to diplexer $400_2$. Although this disclosure describes and illustrates particular diplexers configured to aggregate, combine, separate, or route particular signals having particular frequency ranges, this disclosure contemplates any suitable diplexers configured to aggregate, combine or separate any suitable signals having any suitable frequency ranges.

In particular embodiments, Mux/Demux module 340 and diplexers $400_1$, $400_2$, and $400_3$ illustrated in FIG. 4 may operate in a reverse sense with respect to FIG. 4 (e.g., for use in another wireless station 200 configured to communicate with wireless station 200 illustrated in FIG. 4). As an example and not by way of limitation, a Mux/Demux module 340 may receive a 71-76 GHz RF signal at port 5, and the received signal may be separated into a 71-73 GHz signal (which is sent to port 1) and a 74-76 GHz signal (which is sent to port 2). As another example and not by way of limitation, an input 81-83 GHz signal received at port 3 may be aggregated with an input 84-86 GHz signal received at port 4 to produce a 81-86 GHz output signal at port 5. In particular embodiments, Mux/Demux module 340 may be a single, discrete five-port device that includes multiple waveguide cavity filters with pass-bands 71-73 GHz, 74-76 GHz, 81-83 GHz, and 84-86 GHz interconnected using waveguides within module 340.

Figure 5:
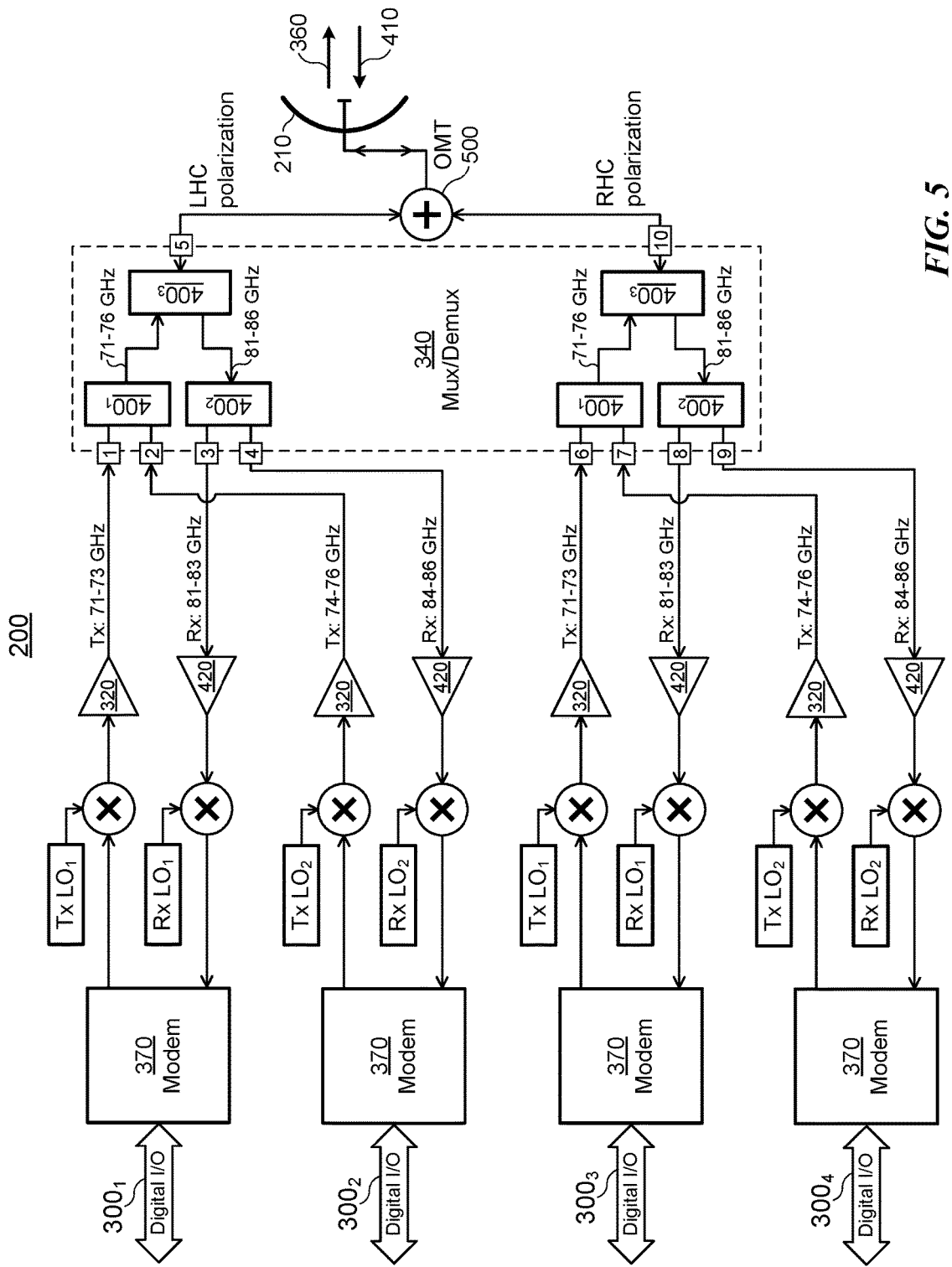
FIG. 5 illustrates an example bidirectional wireless station with four input/output channels.

FIG. 5 illustrates an example bidirectional wireless station 200 with four input/output channels $300_1$, $300_2$, $300_3$, and $300_4$. In the example of FIG. 5, each digital data channel 300 may have an input and output data rate of 8 Gbps. The four input data channels $300_1$, $300_2$, $300_3$, and $300_4$ may be combined into transmitted communication signal 360 to produce a link 150 with a total transmitted data rate of 32

Gbps. Similarly, received communication signal 410 may have a total received data rate of 32 Gbps, and the communication signal 410 may be separated into four output data channels 300 each having an output data rate of 8 Gbps. In the example of FIG. 5, wireless station 200 includes four amplifiers 320 for separately amplifying the four RF signals (e.g., two 71-73 GHz signals and two 74-76 GHz signals) prior to aggregation by Mux/Demux module 340. In particular embodiments, each amplifier 320 may consume 15 W or less of electrical power during operation, resulting in a total power consumption for the four amplifiers 320 of 60 W or less.

The wireless station 200 illustrated in FIG. 5 corresponds to a combination of two of the wireless stations 200 illustrated in FIG. 4. The upper portion of FIG. 5 (with channels $300_1$ and $300_2$) corresponds to a first wireless station 200 as illustrated in FIG. 4, and the lower portion of FIG. 5 (with channels $300_3$ and $300_4$) corresponds to a second wireless station 200 as illustrated in FIG. 4. In FIG. 5, the 71-76 GHz output signals from the upper and lower portions are combined using an orthomode transducer (OMT) 500. In particular embodiments an OMT may refer to a passive polarization duplexer that is configured to combine or separate two orthogonally polarized RF signals. In particular embodiments, transmitting communication signal 360 may include simultaneously transmitting a first signal having a first polarization with a second signal having a second polarization orthogonal to the first polarization. In FIG. 5, the first 71-76 GHz signal from port 5 of Mux/Demux module 340 includes the data from channels $300_1$ and $300_2$, and the second 71-76 GHz signal (from port 10) includes the data from channels $300_3$ and $300_4$. The 71-76 GHz signal from port 5 is configured to have a left-hand circular polarization, and the other 71-76 GHz signal (from port 10) is configured to have a right-hand circular polarization. The OMT 500 combines the orthogonal LHC-polarized and RHC-polarized signals into one signal which is fed to antenna 210 for transmission as transmitted communication signal 360. Similarly, received communication signal 410 may include two orthogonally polarized signals in the 81-86 GHz frequency range. The two orthogonally polarized signals received by antenna 410 are separated by OMT 500. The LHC-polarized 81-86 GHz signal is sent to port 5, and the RHC-polarized 81-86 GHz signal is sent to port 10.

In the example of FIG. 5, Mux/Demux module 340 has 10 ports (labeled 1 through 10). Ports 1 and 2 are configured to receive amplified RF signals in the 71-73 GHz and 74-76 GHz range, respectively, and Mux/Demux module 340 multiplexes these signals into a 71-76 GHz signal which is sent out port 5 to OMT 500. Similarly, ports 6 and 7 are configured to receive amplified RF signals in the 71-73 GHz and 74-76 GHz range, respectively, and Mux/Demux module 340 multiplexes these signals into a 71-76 GHz signal which is sent out port 10 to OMT 500. Additionally, port 5 receives a 81-86 GHz signal from OMT 500, and Mux/Demux module 340 demultiplexes this RF signal into a 81-83 GHz signal (which is sent out port 3) and a 84-86 GHz signal (which is sent out port 4). Similarly, port 10 receives a 81-86 GHz signal from OMT 500, and Mux/Demux module 340 demultiplexes this RF signal into a 81-83 GHz signal (which is sent out port 8) and a 84-86 GHz signal (which is sent out port 9).

As illustrated in FIG. 5, Mux/Demux module 340 may include six diplexers 400. Diplexers $400_1$ are each configured to combine a 71-73 GHz signal with a 74-76 GHz signal to produce one 71-76 GHz signal. Diplexers $400_2$ are each configured to receive a 81-86 GHz RF signal and separate it into a 81-83 GHz RF signal and a 84-86 GHz RF signal. Diplexers $400_3$ are each configured to combine, separate, or route a 71-76 GHz signal and a 81-86 GHz signal. In particular embodiments (and as illustrated in FIG. 5), wireless station 200 may include a single 10-port Mux/Demux module 340 that includes six diplexers 400 integrated within the module. In other particular embodiments, wireless station 200 may include two separate Mux/Demux modules 340 where each module is a five-port device similar to the Mux/Demux module 340 illustrated in FIG. 4.

Figure 6:
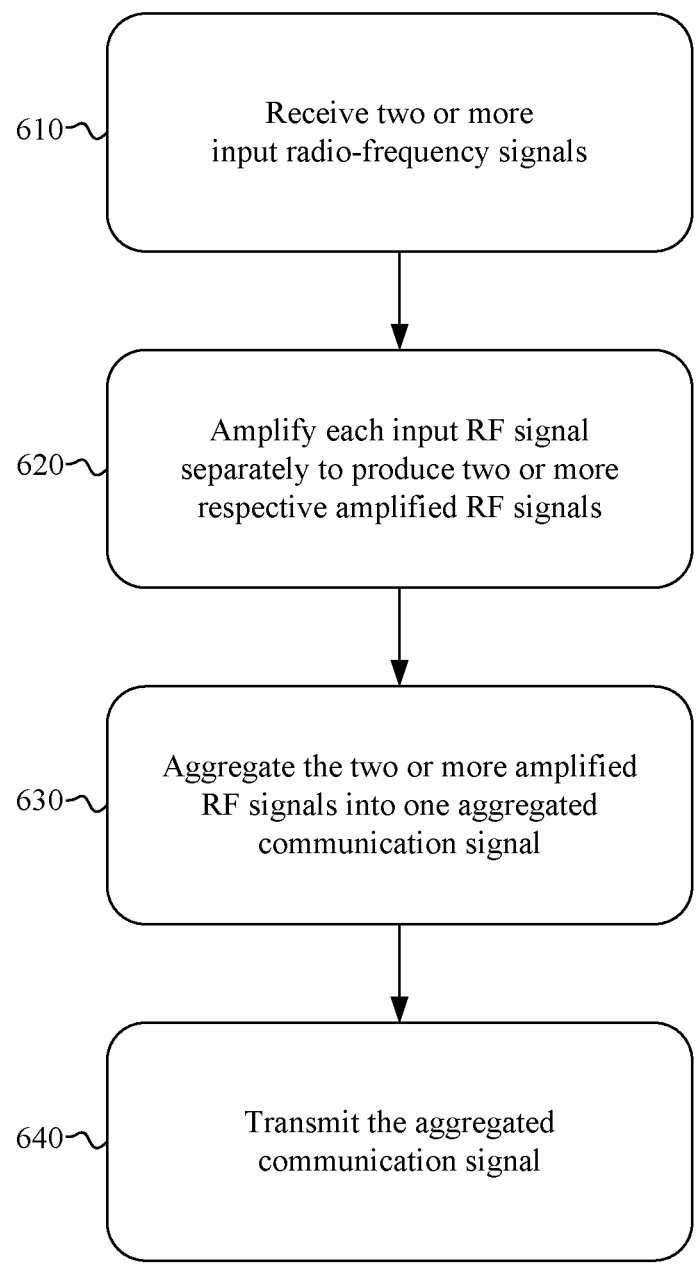
FIG. 6 illustrates an example method for transmitting a signal using post-amplification carrier aggregation.

FIG. 6 illustrates an example method 600 for transmitting a signal using post-amplification carrier aggregation. In particular embodiments, method 600 of FIG. 6 may be used in part of a point-to-point wireless communication link 150 with a data rate of 1 to 100 Gbps. The method may begin at step 610, where two or more input radio-frequency signals are received. As an example and not by way of limitation, two E-band signals ($f_1$ and $f_2$) may be received by an amplifier/multiplexer module 330 which includes two RF amplifiers 320 and a Mux/Demux module 340. At step 620, each input RF signal is amplified separately to produce two or more respective amplified RF signals. As an example and not by way of limitation, two input RF signals may be amplified separately by two respective RF power amplifiers 320. At step 630, the two or more amplified RF signals are aggregated into one aggregated communication signal 350 using a passive waveguide multiplexer. The aggregated communication signal 350 may be an E-band communication signal having a frequency range within approximately 71-76 GHz or approximately 81-86 GHz. As an example and not by way of limitation, a Mux/Demux module 340 may be used to aggregate (or, combine) the two or more amplified RF signals to produce an aggregated communication signal 350 with a 71-76 GHz frequency range. At step 640, the aggregated communication signal 350 is transmitted. As an example and not by way of limitation, the communication signal 350 may be a 71-76 GHz signal transmitted by an antenna 210 to a wireless station 200 located 10-40 km away. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for transmitting a signal using post-amplification carrier aggregation including the particular steps of the method of FIG. 6, this disclosure contemplates any suitable method for transmitting a signal using post-amplification carrier aggregation including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
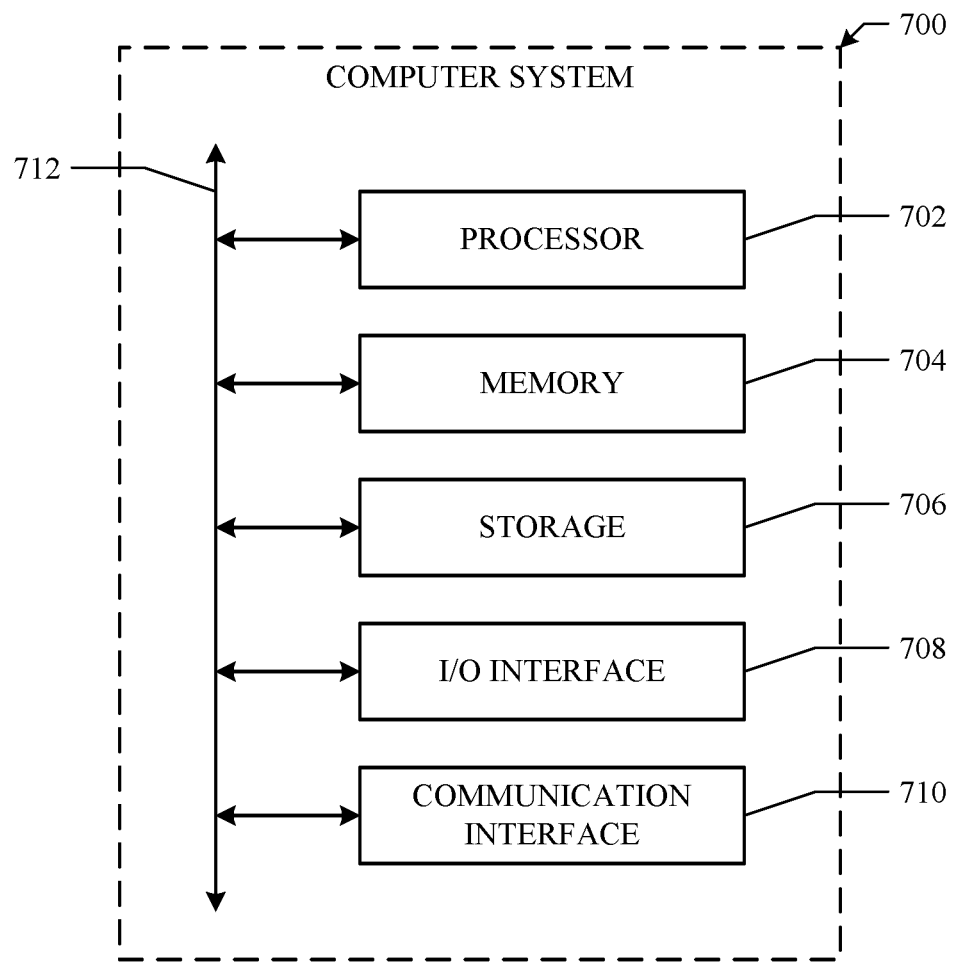
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A method comprising:
modulating more than two independent data streams to generate more than two respective independent analog baseband modulated signals;
upconverting each of the more than two independent analog baseband modulated signals using respective local oscillators to produce more than two input RF signals, wherein each local oscillator has a different frequency;
receiving the more than two input radio-frequency (RF) signals, each input RF signal being received on a separate input channel and having a different frequency range;
amplifying each input RF signal of the more than two input RF signals separately to produce more than two respective amplified RF signals;
employing a post-amplification aggregation process on the more than two amplified RF signals by aggregating the more than two amplified RF signals into one aggregated communication signal using a passive waveguide multiplexer, wherein the aggregated communication signal is an E-band communication signal having a frequency range within approximately 71-76 GHz or approximately 81-86 GHz; and
transmitting the aggregated communication signal.

2. The method of claim 1, wherein modulating the more than two independent data streams comprises modulating the data streams using phase-shift keying (PSK), frequency-shift keying (FSK), amplitude-shift keying (ASK), or quadrature amplitude modulation (QAM).

3. The method of claim 1, wherein the passive waveguide multiplexer has an insertion loss of less than 1 dB.

4. The method of claim 1, wherein the passive waveguide multiplexer comprises a metallic waveguide or a substrate integrated waveguide.

5. The method of claim 1, wherein transmitting the aggregated communication signal comprises transmitting the aggregated communication signal through a single antenna aperture.

6. The method of claim 1, wherein transmitting the aggregated communication signal comprises transmitting the aggregated communication signal as a free-space electromagnetic wave.

7. The method of claim 1, further comprising:
receiving at least a portion of the transmitted communication signal;
separating the received communication signal into more than two constituent RF signals corresponding to the more than two respective amplified RF signals;
down-converting each of the more than two constituent RF signals using more than two respective local oscillators to produce more than two independent analog baseband signals, wherein each local oscillator has a different frequency; and
demodulating the more than two independent analog baseband signals to produce more than two respective independent bit streams.

8. The method of claim 1, wherein:
the more than two input RF signals comprise a first input RF signal and a second input RF signal;
the first input RF signal has a frequency range of approximately $f_A$ to $f_B$, wherein $f_A$ is less than $f_B$; and
the second input RF signal has a frequency range of approximately $f_C$ to $f_D$, wherein:
$f_B$ is approximately equal to $f_C$; and
$f_C$ is less than $f_D$.

9. The method of claim 1, wherein:
the more than two input RF signals comprise a first input RF signal and a second input RF signal;
the first input RF signal has a frequency range of approximately $f_A$ to $f_B$, wherein $f_A$ is less than $f_B$; and
the second input RF signal has a frequency range of approximately $f_C$ to $f_D$, wherein:
$f_B$ is less than $f_C$; and
$f_C$ is less than $f_D$.

10. The method of claim 1, wherein:
each of the more than two input RF signal has an average power of approximately 0.01 mW to approximately 100 mW; and
each of the more than two amplified RF signal has an average power of approximately 10 mW to approximately 50 W.

11. The method of claim 1, wherein amplifying each of the more than two input RF signal comprises amplifying each of the more than two input RF signal by an amplifier operating with a power-added efficiency (PAE) of greater than or equal to approximately 1%.

12. The method of claim 1, wherein amplifying each input RF signal comprises amplifying each input RF signal by a gallium-nitride-based amplifier, a gallium-arsenide-based amplifier, a silicon-germanium-based amplifier, or an amplifier with a silicon on insulator/complementary metal-oxide-semiconductor structure.

13. The method of claim 1, wherein amplifying each of the more than two input RF signal comprises amplifying each of the more than two input RF signal by a traveling-wave tube amplifier.

14. The method of claim 1, wherein the aggregated communication signal is configured to transmit data at a data rate of approximately 16 gigabits per second.

15. The method of claim 1, wherein transmitting the aggregated communication signal comprises transmitting the aggregated communication signal in a particular polarization, and further comprising, simultaneously transmitting another communication signal having a polarization orthogonal to the particular polarization.

16. The method of claim 1, wherein:
each of the more than two input RF signal corresponds to a data stream with a data rate of approximately 8 gigabits per second (Gbps); and
the aggregated communication signal forms at least a portion of a 32-Gbps bidirectional communication link.

17. The method of claim 1, wherein:
the aggregated communication signal is transmitted from an unmanned aerial vehicle (UAV) to a ground-based antenna;
the aggregated communication signal forms at least a portion of a bidirectional communication link between the UAV and the ground-based antenna; and
the UAV is configured to provide wireless connectivity for ground-based client systems.

18. A system comprising:
more than two modems, each modem configured to:
modulate a respective independent data stream to generate a respective independent analog baseband modulated signal;
more than two local oscillators, each oscillator configured to:
upconvert a different one of the more than two independent analog baseband modulated signals to produce a respective one of more than two input RF signals, wherein each of the more than two local oscillator has a different frequency;
more than two amplifiers, each amplifier configured to:
receive an input radio-frequency (RF) signal of a respective one of more than two input RE signals, each input RF signal having a different frequency range; and
amplify the more than two input RF signal to produce an amplified RF signal;
a multiplexer configured to:
receive the more than two amplified RF signals, each of the amplified RF signals comprising the amplified RF signal produced by each amplifier; and
employ a post-amplification aggregation process on the more than two amplified RF signals, the post-amplification aggregation process including aggregating the more than two amplified RF signals into one aggregated communication signal using a passive waveguide multiplexer, wherein the aggregated communication signal is an E-band communication signal having a frequency range within approximately 71-76 GHz or approximately 81-86 GHz; and an antenna configured to transmit the aggregated communication signal.

19. A system comprising:

means for modulating more than two independent data streams to generate more than two respective independent analog baseband modulated signals;

means for upconverting each of the more than two independent analog baseband modulated signals using respective local oscillators to produce more than two input RF signals, wherein each local oscillator has a different frequency;

means for receiving the more than two input radio-frequency (RF) signals, each input RF signal being received on a separate input channel and having a different frequency range;

means for amplifying each input RF signal of the more than two input RF signals separately to produce more than two respective amplified RF signals;

means for employing a post-amplification aggregation process on the more than two amplified RF signals by aggregating the more than two amplified RF signals into one aggregated communication signal using a passive waveguide multiplexer, wherein the aggregated communication signal is an E-band communication signal having a frequency range within approximately 71-76 GHz or approximately 81-86 GHz; and means for transmitting the aggregated communication signal.

* * * * *